US012614104B1

(12) United States Patent
Pronovost

(10) Patent No.: US 12,614,104 B1
(45) Date of Patent: Apr. 28, 2026

(54) EXPERIMENT TRACKING SYSTEM

(71) Applicant: Zoox, Inc., Foster City, CA (US)

(72) Inventor: Ethan Miller Pronovost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 1113 days.

(21) Appl. No.: 17/333,880

(22) Filed: May 28, 2021

(51) Int. Cl.
| | |
|---|---|
| *G06N 20/00* | (2019.01) |
| *G06F 16/9038* | (2019.01) |
| *G06F 16/904* | (2019.01) |
| *G06F 16/906* | (2019.01) |
| *G06F 18/214* | (2023.01) |

(52) U.S. Cl.
CPC ......... *G06N 20/00* (2019.01); *G06F 16/9038* (2019.01); *G06F 16/904* (2019.01); *G06F 16/906* (2019.01); *G06F 18/214* (2023.01)

(58) Field of Classification Search
CPC ... G06N 20/00; G06F 16/9038; G06F 16/904; G06F 16/906; G06F 18/214
See application file for complete search history.

(56) References Cited

U.S. PATENT DOCUMENTS

| | | | | |
|---|---|---|---|---|
| 2018/0336493 A1* | 11/2018 | Hayes | .................... | G06N 20/00 |
| 2020/0012934 A1* | 1/2020 | Goodsitt | ................ | G06F 9/541 |
| 2021/0374549 A1* | 12/2021 | Willmott | ............... | G06N 3/126 |

OTHER PUBLICATIONS

Hutter, Frank, Holger Hoos, and Kevin Leyton-Brown. "An efficient approach for assessing hyperparameter importance." (Year: 2014).*
Ma, Ningning, et al. "Weightnet: Revisiting the design space of weight networks." (Year: 2020).*
Swersky, Kevin, Jasper Snoek, and Ryan Prescott Adams. "Freeze-thaw Bayesian optimization." (Year: 2014).*
Hertel, Lars, et al. "Sherpa: Robust hyperparameter optimization for machine learning." (Year: 2020).*
Bardenet, Rémi, et al. "Collaborative hyperparameter tuning." (Year: 2013).*
Chien, et al., "Meta Learning for Hyperparameter Optimization in Dialogue System." (Year: 2019).*

(Continued)

*Primary Examiner* — Michelle T Bechtold
*Assistant Examiner* — Matiyas T Maru
(74) *Attorney, Agent, or Firm* — Lee & Hayes, P.C.

(57) ABSTRACT

Techniques for an experiment tracking system for experiments on machine learning models are described herein. For example, the techniques may include receiving an experiment request associated with an ML model including a plurality of values of an experiment hyperparameter and a static value of a hyperparameter. The ML experiment system may generate a configurable hyperparameter set of the ML model including the experiment hyperparameter and the hyperparameter, evaluate the ML model to generate an experimental result corresponding to a version of the configurable hyperparameter set with the experiment hyperparameter having a value of the plurality of values and the hyperparameter having the static value, and store the experimental result in an experiment tracking datastore such that the experimental result is retrievable based on a query including query parameters that match corresponding configurable hyperparameters of the version of the configurable hyperparameter set.

20 Claims, 5 Drawing Sheets

(56)                    References Cited

OTHER PUBLICATIONS

Metz, et al., "Using a thousand optimization tasks to learn hyperparameter search strategies." (Year: 2020).*
Zhang, Baohe, et al. "On the importance of hyperparameter optimization for model-based reinforcement learning." (Year: 2018).*

* cited by examiner

300

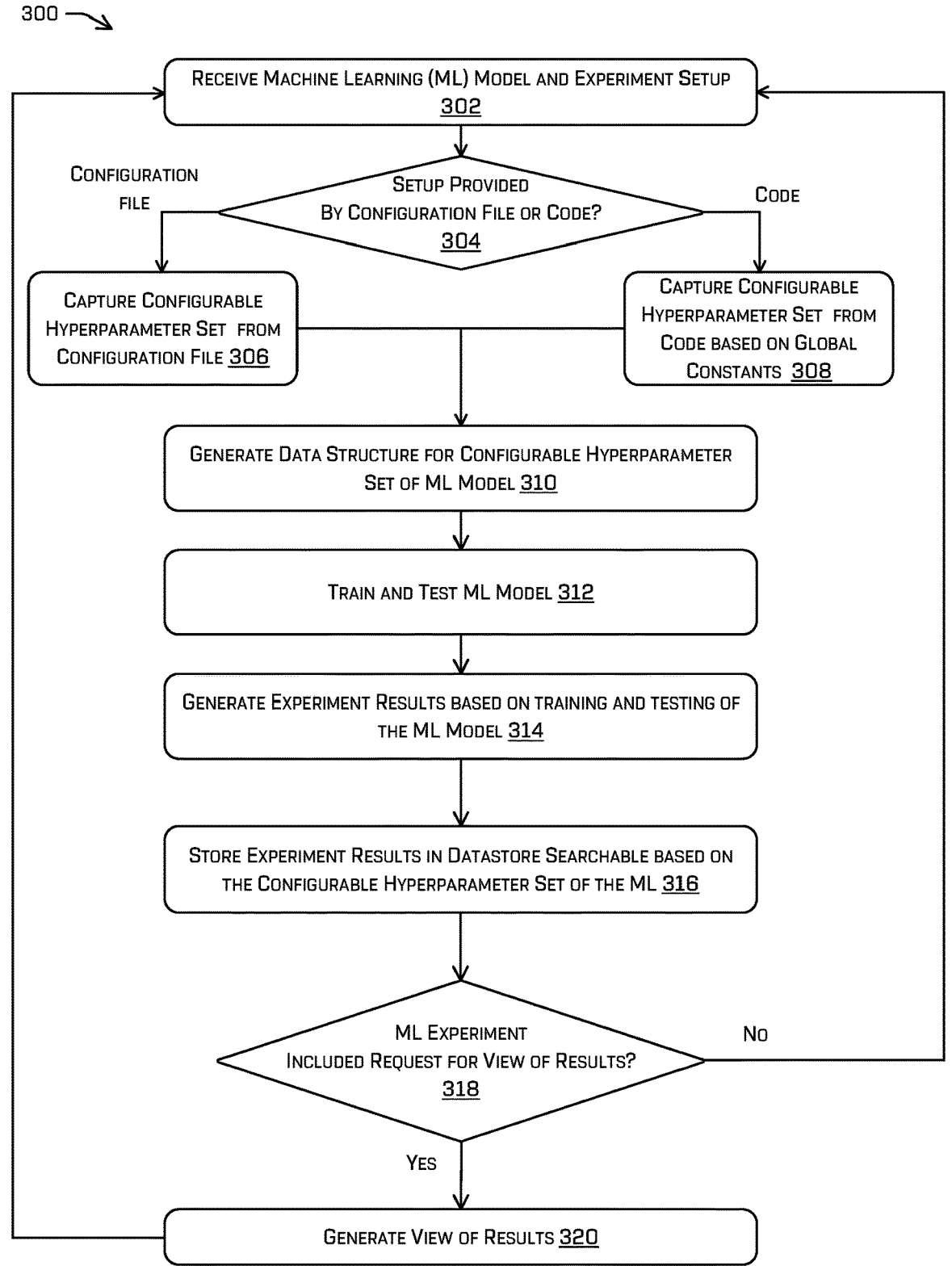

RECEIVE MACHINE LEARNING (ML) MODEL AND EXPERIMENT SETUP
302

CONFIGURATION FILE

SETUP PROVIDED
BY CONFIGURATION FILE OR CODE?
304

CODE

CAPTURE CONFIGURABLE HYPERPARAMETER SET FROM CONFIGURATION FILE 306

CAPTURE CONFIGURABLE HYPERPARAMETER SET FROM CODE BASED ON GLOBAL CONSTANTS 308

GENERATE DATA STRUCTURE FOR CONFIGURABLE HYPERPARAMETER SET OF ML MODEL 310

TRAIN AND TEST ML MODEL 312

GENERATE EXPERIMENT RESULTS BASED ON TRAINING AND TESTING OF THE ML MODEL 314

STORE EXPERIMENT RESULTS IN DATASTORE SEARCHABLE BASED ON THE CONFIGURABLE HYPERPARAMETER SET OF THE ML 316

ML EXPERIMENT
INCLUDED REQUEST FOR VIEW OF RESULTS?
318

No

YES

GENERATE VIEW OF RESULTS 320

FIG. 3

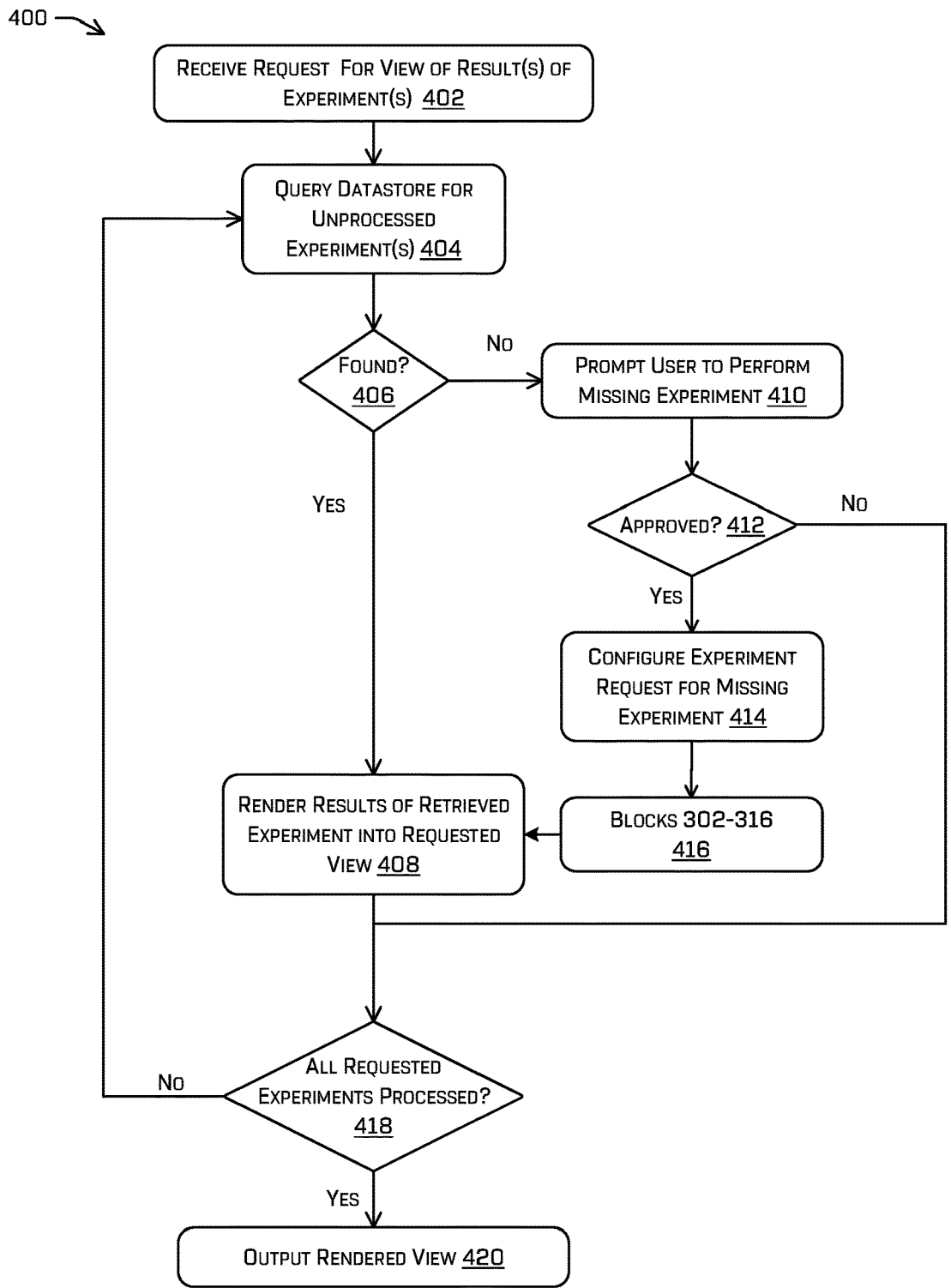

400

RECEIVE REQUEST FOR VIEW OF RESULT(S) OF EXPERIMENT(S) 402

QUERY DATASTORE FOR UNPROCESSED EXPERIMENT(S) 404

FOUND? 406

No → PROMPT USER TO PERFORM MISSING EXPERIMENT 410

YES

APPROVED? 412

No

YES

CONFIGURE EXPERIMENT REQUEST FOR MISSING EXPERIMENT 414

RENDER RESULTS OF RETRIEVED EXPERIMENT INTO REQUESTED VIEW 408

BLOCKS 302-316 416

ALL REQUESTED EXPERIMENTS PROCESSED? 418

No

YES

OUTPUT RENDERED VIEW 420

FIG. 4

EXPERIMENT TRACKING SYSTEM

BACKGROUND

Machine learning (ML) models such as neural networks often learn to perform a task by considering training data. Experimentation may be performed to improve the ML model. For example, comparisons of various configurations of the ML model may allow for optimization. In some cases, a comparison may be desired for a current experiment and a past experiment. However, conducting experiments on ML models may be time and resource consuming, so repeating the past experiment to conduct such a comparison may be undesirable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates an example process for experimentation on ML models including hyperparameter neutral tracking of experimental results.

FIG. 4 illustrates an example process for retrieval and presentation of current and/or past experimental results.

DETAILED DESCRIPTION

Figure 1:
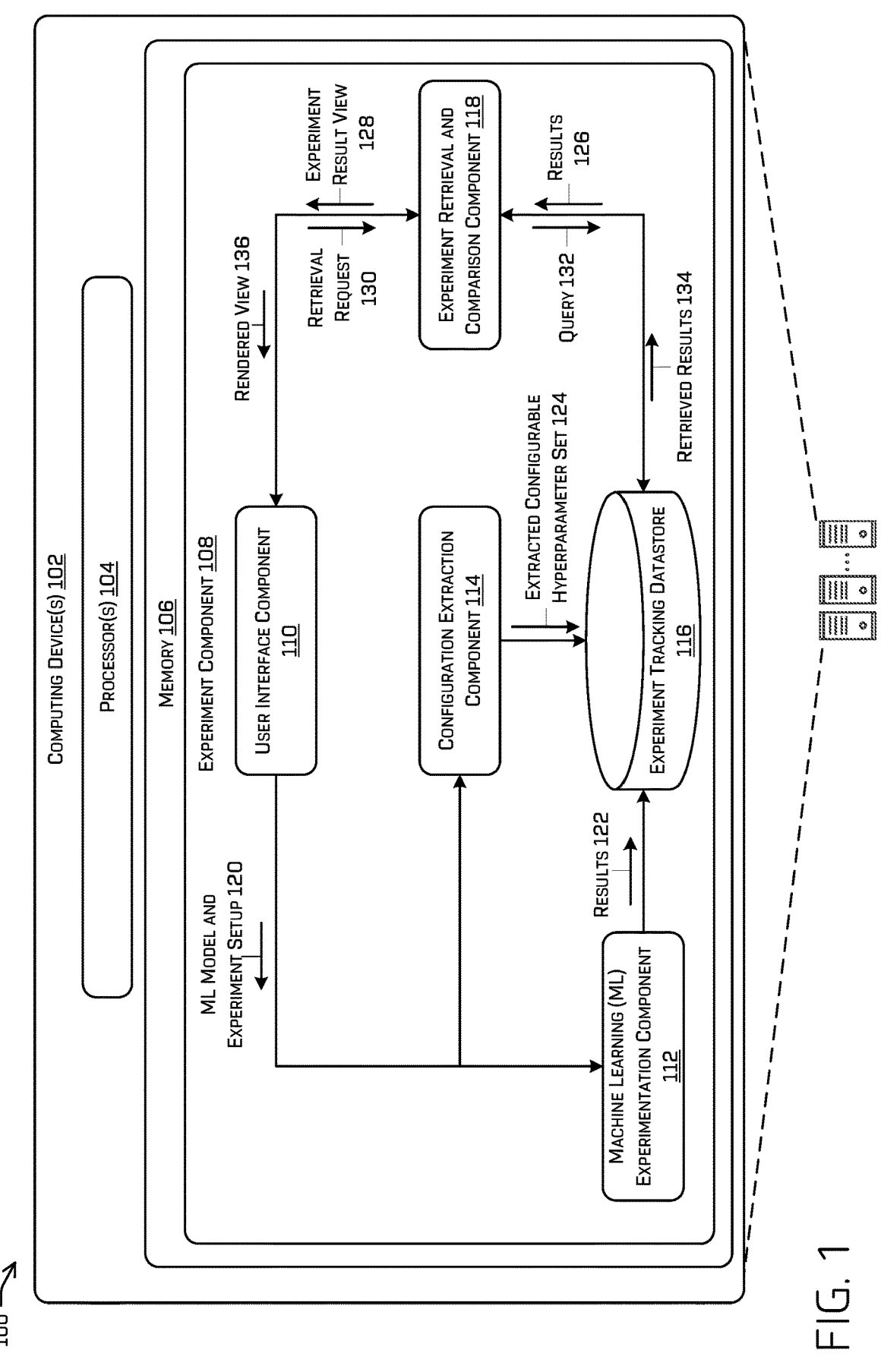
FIG. 1 illustrates an example environment in which the techniques discussed herein may be implemented.

This disclosure is directed to systems and techniques that provide an experiment tracking system. In some examples, the systems and techniques according to this disclosure may provide for tracking and subsequent retrieval and/or comparison for current and previous experiments where the hyperparameters being optimized may have changed in the interim.

Hyperparameters may be variables that determine a network structure (e.g., a number of hidden layers and/or nodes per layer, dropout, network weight initialization, activation function, whether to include a batch normalization layer, etc.) and variables which determine how the network is trained (e.g., learning rate, momentum, number of epochs, batch size, etc.). When building, training, developing or otherwise defining a ML model, a subset of hyperparameters, referred to herein as experiment hyperparameters, may be chosen for the experiment from among the full set of hyperparameters of the ML model. The values of the experiment hyperparameters may be considered with the metrics for the ML model when operating with those values to improve the ML model. For example, an experiment may include a plurality of values for each experiment hyperparameter and a constant value for each of the other hyperparameters. Conducting the experiment may include training and/or testing a version of the ML model for one or more combinations of the values of the experiment hyperparameter. Metrics may be generated as each version is trained and tested.

In absence of the experiment tracking system disclosed herein, the metrics may have been published in relation to the chosen experiment hyperparameters. However, as mentioned above, over the course of experimentation with a ML model, the experiment hyperparameters chosen may change (e.g., other hyperparameters of the ML model may be added to the subset or experiment hyperparameters may be removed from the chosen subset). Metrics published in relation to the initial experiment hyperparameters may not be used in comparison to metrics published in relation to the changed experiment hyperparameters because the value of any new experiment hyperparameters are unknown for earlier experiments, despite being hyperparameters of the ML model of the earlier experiments.

For example, a user may run experiments which compare the metrics of a ML model for changing values of an experiment hyperparameter X. Then, later, the user may decide to run experiments which compare the metrics of a ML model for changing values of an experiment hyperparameter Y. Unless the user knew in advance to also chose hyperparameter Y as an experiment hyperparameter (e.g., which the user may have believed was irrelevant in their initial experiments), the user will not able to compare the first round of experiments (e.g., changing experiment hyperparameter X for some fixed value of hyperparameter Y) with later work (e.g., changing experiment hyperparameter Y for some fixed value of hyperparameter X), even though the metrics are valid.

Further, because the experiment hyperparameters may be selected and published at training time, modifying the representation of the experiment hyperparameters afterward may be difficult. For example, after changing the experiment code, a user may wish that a previous experiment hyperparameter was represented differently. Since the experiment hyperparameters may be selected and published at training time, the user may be unable to modify the representation.

Examples according to this disclosure may generate and publish a configurable hyperparameter set for experiments in addition to or instead of the currently chosen experiment hyperparameters. More particularly, some examples may generate a data structure representative of the complete set of configurable hyperparameters of the ML model associated with the experiment. Depending on the example, the configurable hyperparameter set may be captured from a configuration file or by parsing code of the ML model and/or training program to capture global constants (e.g., which may be used as hyperparameters).

The experiment results (e.g., trained ML model, metrics for the experiment and any other data recorded for the experiment) may be stored in an experiment tracking datastore that may be searched based on the configurable hyperparameter set associated with the experiment. More particularly, when requesting the retrieval of an experiment from the experiment tracking system, a user may select particular hyperparameters of the configurable hyperparameter set to be treated as experiment hyperparameters for the current operations. Further, some implementations may allow the user to change the designation or representation used for an experiment hyperparameter when selecting the configurable hyperparameter from the configurable hyperparameter set. In this way, some examples may allow for experiment hyperparameters to be changed at any time after an experiment has run. Thus, the experiment tracking system may allow for previously unchosen hyperparameters to be treated as experiment hyperparameters and may allow for newly devised comparisons.

In some implementations, the experiment tracking system may also prepare and conduct experiments. For example, if a user requests the experiment tracking system provide an analysis, comparison or other operation that includes an experiment result not present in the datastore (e.g., results for an experiment on a set of experiment hyperparameters that has not been conducted), the experiment tracking system may prompt the user for approval to perform the experiment. If the user approves, the experiment tracking system may conduct the experiment or request the experiment to be conducted by another system. The experiment tracking system may receive and/or store the results of the requested experiment, then incorporate the results into a response to the user request.

Additional details and variations of the experiment tracking system are provided below with reference to the following figures.

In examples, the experiment tracking techniques discussed herein may provide greater efficiency and flexibility when compared to other experiment systems not using the experiment tracking techniques discussed herein. For example, as mentioned above, the experiment tracking system disclosed herein may provide for the use and/or reuse of experimental results in comparisons including after the experiment hyperparameters have changed and/or new hyperparameters of the ML model have been chosen as experiment hyperparameters (e.g., new hyperparameters are selected as experiment hyperparameters in later experiments). Further, such techniques provide for selective performance of additional experimentation to obtain missing experiment data for a requested comparison, without the user having to determine which of the requested experiment have or have not already been performed and manually request performance of the missing experiments.

The methods, apparatuses, and systems described herein can be implemented in a number of ways. Example implementations are provided below with reference to the following figures. Although discussed in the context of an autonomous vehicle system in some examples below, the methods, apparatuses, and systems described herein can be applied to a variety of systems. Additionally, or alternatively, the techniques described herein can be used with real data (e.g., captured using sensor(s)), simulated data (e.g., generated by a simulator), or any combination thereof.

FIG. 1 illustrates an example environment 100 in which the techniques discussed herein may be implemented. In particular, the environment 100 includes a computing device(s) 102 that includes a processor(s) 104 and memory 106. The memory may store an experiment component 108 including a user interface component 110, a machine learning (ML) experimentation component 112, a configuration extraction component 114, an experiment tracking datastore 116 and an experiment retrieval and comparison component 118 that are executable by the processor(s) 104. Further, though the experiment component 108 is depicted in FIG. 1 as residing in a particular computing device 102, such a depiction is for illustrative purposes, as portions of the experiment component 108 may be in multiple computing devices 102, which may or may not be local. In general, the experiment component 108 may be used in experimentation to develop ML models and may provide for tracking and subsequent retrieval and/or comparison between current and previous experiments where the experiment hyperparameters may have changed in the interim.

The user interface component 110 may be executable by the processor(s) 104 to allow a user to interface with the functionality of the experiment component 108. For example, the user interface component 110 may receive input from the user regarding the setup of a ML model and an experiment to be performed on the ML model. The user interface component 110 may output a ML model and experiment setup 120 to the ML experimentation component 112 and the configuration extraction component 114. In some cases, the user interface component 110 may provide for modification of previous ML models and/or experiment setups in addition to the entry of original ML models and/or experiment setups.

In addition, the user interface component 110 may receive input from the user regarding the retrieval and presentation of experiment results. More particularly, the user interface component 110 may provide for the input of requests for rendered views of experiments stored in the experiment tracking datastore 116. Such views may be associated with a single experiment or with multiple experiments. Additional details regarding the retrieval of experiment data and presentation of views to the user is provided below with regard to the experiment tracking datastore 116 and experiment retrieval and comparison component 118.

The ML experimentation component 112 may be executable by the processor(s) 104 to, based on the ML model and experiment setup 120, set up untrained ML model(s) and/or configure an experiment to be performed on the untrained ML model(s). For example, for a given combination of experiment hyperparameters, the ML experimentation component 112 may configure a ML model with an architecture defined by the ML model and experiment setup 120 and may retrieve training data identified by the ML model and experiment setup 120. The ML experimentation component 112 may then train the untrained ML based on the training data. The training data may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object). In some examples, such labeled classifications (or more generally, the labeled output associated with training data) may be referred to as ground truth.

In some examples, the ML model may be an artificial neural network. Such a neural network may be trained to perform one or more tasks. Some examples of machine learning models that may be trained include neural networks that may: classify objects in image data; identify an emergency vehicle in audio data; generate bounding boxes from lidar data; predict locations of objects; determine when to buy plane tickets; identify cancer in tissue samples, and so on. In an example, the ML model may be a neural network that includes a plurality of layers. The layer that receives external data may be referred to as the input layer. The layer that produces the result may be referred to as the output layer. In between the input layer and output layer may be zero or more hidden layers. Each layer may include one or more nodes (also referred to as neurons or perceptrons). For example, the neural network may include five layers that include between four and six nodes each. However, it can be understood that any number of layers and/or nodes may be implemented. A node, such as a node associated with a hidden layer, may be associated with an operation and a weight. An operation at one layer may be executed to generate an activation, which is provided to a next layer as input (e.g., to an operation associated with the next layer in a forward graph). Such activations may be, for example, a sigmoid function, arctan, ReLU, hyperbolic arctan, Heaviside, and the like.

Such training may include forward propagation and backwards propagation. In forward propagation for an artificial neural network, data may be input into the artificial neural network to compute activations at layers within the artificial neural network, and ultimately, an output. Then, during back propagation (also referred to as a backwards pass or backwards propagation), an error representing a difference between the output and a desired output (e.g., a ground truth) may be propagated backwards through the layers of the artificial neural network to adjust the current values of the sets of parameters for the neural network layers (e.g., using gradient descent). The backwards propagation may include executing one or more gradient operations associated with the one or more operations of the forward propagation to generate one or more gradients.

Following training, the ML experimentation component 112 may be executed by the processor(s) 104 to evaluate or test the trained ML model. For example, the ML experimentation component 112 may process new data with the trained ML model and make inferences regarding the new data (e.g., predict a value, classify the new data, etc.). To illustrate, the ML experimentation component 112 may implement a neural network to classify objects in a new image. While implementing the neural network, the ML experimentation component 112 may not perform backwards propagation, since backwards propagation is used to train the neural network. In some examples, the ML experimentation component 112 may be a part of a separate computing device.

Data that is used by the ML experimentation component 112 (e.g., the training data and/or the data that is fed into the trained ML model for inference) may include a variety of data. For example, the data may include depth data from one or more sensors, such as Light Detection and Ranging (lidar) data, radar data, image data (as determined from multi-view geometry), depth sensor data (time of flight, structured light, etc.), etc. In some examples, the computing device(s) 102 may receive (e.g., retrieve) data from a data store, such as a database. Here, the data store can store data over time as the data is received from one or more vehicles or other devices within an environment. In some examples, the computing device(s) 102 may receive data from one or more vehicles or other devices as the data is being captured (e.g., real-time), in a batched manner, in one or more log files received from a vehicle, or at any other time.

In some examples, the computing device(s) 102 may receive a plurality of lidar datasets from a plurality of lidar sensors operated in connection with a perception system of an autonomous vehicle. In some examples, the computing device(s) 102 may combine or fuse data from two or more lidar sensors into a single lidar dataset (also referred to as a "meta spin"). In some examples, the computing device(s) 102 may extract a portion of lidar data for processing, such as over a period of time. In some examples, the computing device(s) 102 may receive radar data and associate the radar data with the lidar data to generate a more detailed representation of an environment. In one illustration, data includes lidar data (e.g., point clouds) associated with various objects in an urban environment, such as cars, trucks, roads, buildings, bikes, pedestrians, etc. Of course, such data need not be sensor data at all. In various examples, training data may comprise features defined for a particular problem and their associated expected output. As a non-limiting example, such data may comprise house square foot size, a number of bedrooms, a number of floors, etc., with an associated home sale price for training a network to predict a houses likely sale price.

During the training and testing operations discussed above, the ML experimentation component 112 may further operate to capture one or more metrics regarding the operation of the ML model for the combination of experiment hyperparameters. Some example metrics include accuracy, log loss, precision, recall or true positive rate or sensitivity, specificity, confusion matrix, type I error, type II error, and F1 score.

As mentioned above, experiments may be directed to multiple versions of the ML model (e.g., one or more combination of values of the experiment hyperparameters). More particularly, the ML model and experiment setup 120 may specify that the experimentation be performed for a range of values for one or more of the experiment hyperparameters (e.g. a range of hidden layer depth and widths) or a set of discrete values. In such cases, the ML experimentation component 112 may perform the training and testing operations discussed above for the multiple versions as specified by the ML model and experiment setup 120.

The ML experimentation component 112 may then output the results of the experimentation for the ML model and experiment setup 120 to the experiment tracking datastore 116 as results 122. The results 122 may include the metrics captured for the training and testing operations as well as any other information regarding the experimentation. In examples in which multiple versions of the ML model were trained and tested, the results 122 may include data associated with each of the version trained and tested. Further, the results 122 may include identification of the associated ML model and experiment setup 120.

The configuration extraction component 114 may be executable by the processor(s) 104 to process the ML model and experiment setup 120 to extract the configurable hyperparameter set 124 of the ML model. For example, the configuration extraction component 114 may be configured to extract the configurable hyperparameter set of the ML model from a configuration file or code included in the ML model and experiment setup 120. If a configuration file is included in the ML model and experiment setup 120, the configuration extraction component 114 may extract the parameters of the configuration as configurable hyperparameters. If code is included in the ML model and experiment setup 120, the configurable hyperparameter set of the ML model may be extracted by capturing global constants and their values from the code. In some examples, the configurable hyperparameter set may be comprehensive (e.g., include all hyperparameters associated with the experiment and/or ML model). In such an example in which code is used to define the ML model and the experiment, the configuration extraction component 114 may capture all global constants within the code and include a configurable hyperparameter for each in the configurable hyperparameter set. However, implementations are not limited to examples that capture every constant or hyperparameter. For example, some configurable hyperparameters may be excluded or otherwise designated as not pertinent to the experimentation. Further, in some examples, the configurable hyperparameters may include hyperparameters input by the user but not captured from the configuration, if any. After extracting the configurable hyperparameter set of the ML model, the configuration extraction component 114 may generate a data structure (e.g. a protobuf or json data structure). The data structure may be searchable or parsable to find each configurable hyperparameter of the configurable hyperparameter set as well as the corresponding value of the configurable hyperparameter. Where the ML model and experiment setup 120 specifies a range of values for an experiment hyperparameter, the data structure may include the range the values in such a way that a search for a particular value in the range or an overlapping range would match the data structure. Separate data structures may be generated for each discrete combination of hyperparameters of the configurable hyperparameter set for which results 122 have been generated.

The configuration extraction component 114 may output the extracted configurable hyperparameter set 124 to the experiment tracking datastore 116. As with the results 122, the extracted configurable hyperparameter set 124 may include identification of the associated ML model and experiment setup 120.

The experiment tracking datastore 116 may be executable by the processor(s) 104 to receive and store the results 122 and extracted configurable hyperparameter set 124 for an associated ML model and experiment setup 120. For example, the experiment tracking datastore 116 may store the results 122 and extracted configurable hyperparameter set 124 to be searchable based on the configurable hyperparameter set (e.g., not just the experiment hyperparameters). Depending on the implementation, the experiment tracking datastore 116 may store the results for experiments that included multiple versions of the ML model (e.g. ranges of values for one or more of the experiment hyperparameters or multiple discrete values for one or more of the experiment hyperparameters) as a single record or as multiple records (e.g. a record for each combinations of experiment hyperparameter values for which a version of the ML model was trained and tested). In any case, the experiment tracking datastore 116 may be configured to store the results 122 such that a subsequent retrieval request matching the values of a configurable hyperparameter set of a version of the ML model that was trained and tested will match the pertinent results associated with the ML model and experiment setup 120.

The experiment tracking datastore 116 may provide the results 126 of the experiment associated with the ML model and experience at 120 to the experiment retrieval and comparison component 118.

The experiment retrieval and comparison component 118 may be executable by the processor(s) 104 to receive the results 126 associated with the ML model and experiment setup 120 and render an experiment result view 128 for presentation to the user by the user interface component 110. Views rendered for experiments may be charts, graphs and/or any other form of visualization pertinent to the experiment. The output of the experiment retrieval and comparison component 118 is not limited to those discussed herein and may include any other manner of outputting the experiment results to the user. One of ordinary skill in the art would understand the various forms and presentations for this information in view of this disclosure. An example experiment result view of multiple experiments is discussed with regard to FIG. 5 below.

The user interface component 110 may receive the experiment result view 128 from the experiment retrieval and comparison component 118. The user interface component 110 may then present the experiment result view 128 to the user (e.g. via a display).

Figure 5:
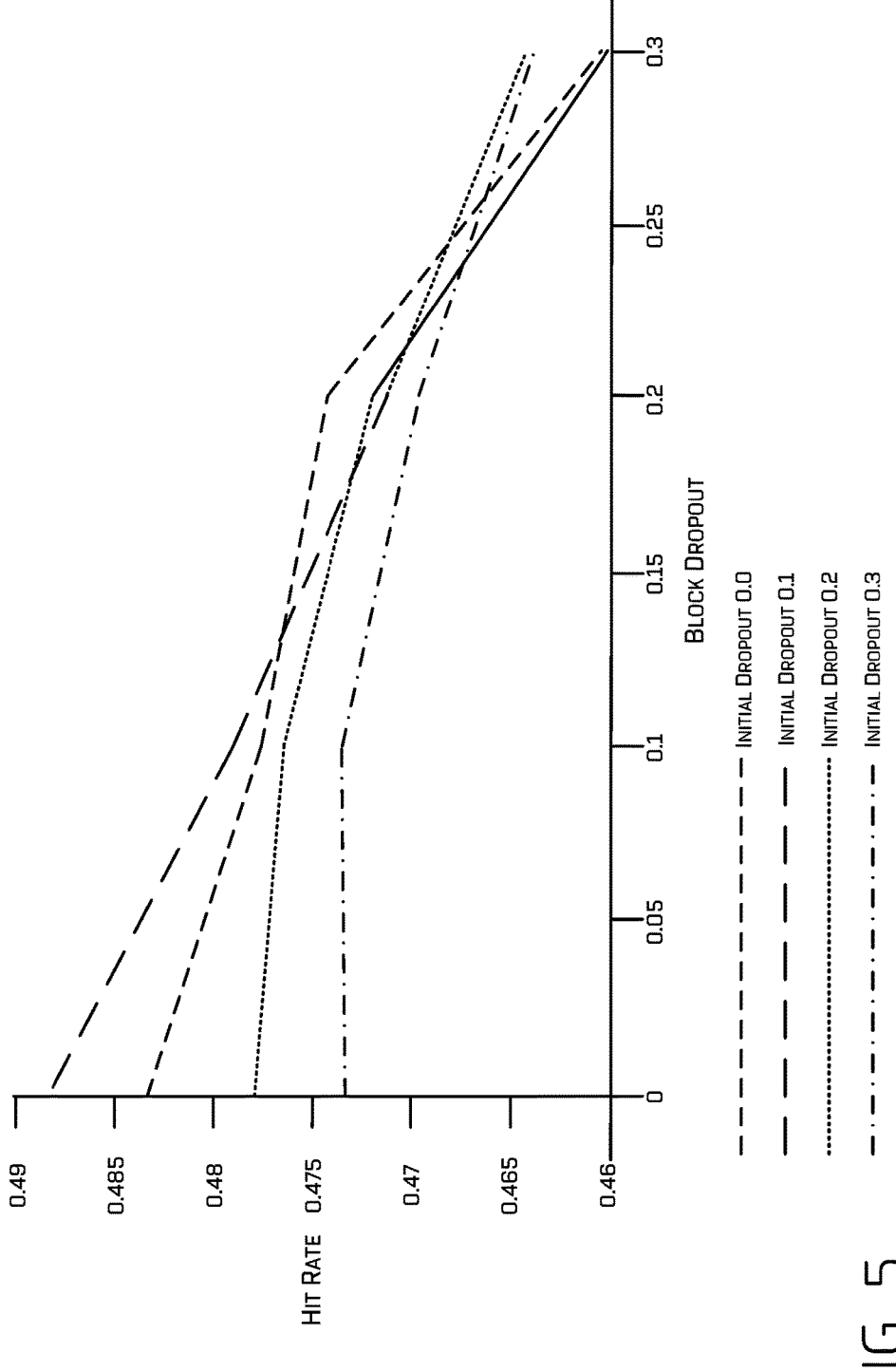
FIG. 5 illustrates an example a comparison view requested for experiments performed for a range of a first configurable hyperparameter (e.g., block dropout) over multiple values of a second configurable hyperparameter (e.g., initial dropout).

Turning to the experiment retrieval and or comparison functionality of the experiment component 108, the user interface component 110 may be configured to receive a request for retrieval of one or more previous experiments and/or a comparison of multiple experiments. The comparison request may include sets or ranges of experiment hyperparameters for which the user would like to view a comparison of metrics. It should be noted that the request is not limited to experiment hyperparameters previously defined in an ML model and experiment setups 120. Rather, the user may indicate other configurable hyperparameters of the ML model to be treated as experiment hyperparameters for the view or comparison being requested. For example, where experiments have been performed directed to a range of values of a hyperparameter X with each experiment including a different value for a hyperparameter Y, the user may wish to view the experiments together (e.g., as a line chart plotting values of hyperparameter X in relation to the metric, with a different line for each value of the hyperparameter Y) or change the view to show the metric over a range of the values of the hyperparameter Y for multiple values of hyperparameter X (e.g., as a line chart plotting values of the hyperparameter Y in relation to the metric, with a different line for each value of the hyperparameter X). An example comparison view of multiple experiments is shown in FIG. 5 and discussed below.

The user interface component 110 may prepare and output a retrieval request 130 to the experiment retrieval and comparison component 118 based on the user input.

The experiment retrieval and comparison component 118 may receive the retrieval request 130 and output a query 132 to the experiment tracking datastore 116 to retrieve results for experiments matching the retrieval request 130. The query 132 may be configured to cause the experiment tracking datastore 116 to retrieve results 122 for each trained and tested version of the ML model matching the retrieval request 130 (e.g., regardless of whether the experiment tracking datastore 116 stores the results for each version individually or on a per experiment basis).

The experiment tracking datastore 116 may retrieve the results 122 for the indicated versions of the ML model and output the retrieved results 134 to the experiment retrieval and comparison component 118.

The experiment retrieval and comparison component 118 may render a view of the retrieved results 134 based on the retrieval request 130 and as discussed above. The experiment retrieval and comparison component 118 may then output the rendered view 136 to the user interface component 110 for presentation to the user (e.g., in a similar manner to the experiment result view 128 discussed above).

Though not shown for ease of illustration, the experiment retrieval and comparison component 118 may further include functionality to handle retrieval requests 130 for which results 122 are not present in the experiment tracking datastore 116. For example, the experiment retrieval and comparison component 118 may receive retrieved results 134 that partially satisfy the query 132 or not receive retrieved results 134 (e.g., no experiments have been performed for the requested versions of the ML model). In such a scenario, the experiment retrieval and comparison component 118 may notify the user via the user interface component 110 and request approval from the user to perform the missing experiment(s). If the user approves, the experiment retrieval and comparison component 118 may generate ML model and experiment setup(s) for the missing experiment(s) (e.g., which may be similar to the ML model and experiment setup 120 discussed above). The experiment retrieval and comparison component 118 may output the ML model and experiment setup(s) for the missing experiment(s) to the ML experimentation component 112 and configuration extraction component 114. The ML experimentation component 112 and configuration extraction component 114 may process the ML model and experiment setup(s) for the missing experiment(s) in a manner similar to that discussed above for the ML model and experiment setup 120. Similarly, the experiment tracking datastore 116 may receive the results and extracted configurable hyperparameter set(s) for the ML model and experiment setup(s) for the missing experiment(s) and store the results in a similar manner as discussed above results 122 and the extracted configurable hyperparameter set 124. Further, the experiment tracking datastore 116 may output the results for the ML model and experiment setup(s) for the missing experiment(s) to the experiment retrieval and comparison component 118.

Upon receiving the results for the ML model and experiment setup(s) for the missing experiment(s), the experiment retrieval and comparison component 118 may combine the results for the ML model and experiment setup(s) for the missing experiment(s) with the retrieved results 134 to generate a rendered view 136 as discussed above. In this way, results for past experiments may be utilized even when the experiment hyperparameters evolve or change over experimentation with the ML model.

Additional and/or alternative functionality of the experiment component 108 may provide further flexibility to users. For example, the user interface component 110 and experiment retrieval and comparison component 118 may allow a user to request a view based on derived hyperparameters. In some examples, a derived hyperparameter may be a function of one or more of the configurable hyperparameters extracted by the configuration extraction component 114. In a particular example, a user may request a view that plots a Y axis representing a hit rate metric against an X axis representing a specified range of values of an example derived hyperparameter defined as the ratio of an initial dropout hyperparameter to a block dropout hyperparameter. Of course, a ratio of these hyperparameters is merely an example derived hyperparameter and derived hyperparameters may be defined using many other functions of (or relationships between) any number of underlying hyperparameters. The experiment retrieval and comparison component 118 may query the experiment tracking database 116 for results for stored past experiments whose initial dropout hyperparameter value and block dropout hyperparameter value have a ratio that falls within the requested range. Upon receiving the results of the query, the experiment retrieval and comparison component 118 may generate a rendered view that includes a scatter plot including a plot point for each experiment (e.g., located based on the individual experiment's derived hyperparameter value and hit rate metric value). The experiment retrieval and comparison component 118 may further generate the rendered view to include a line representing the mean or another trend for the plotted points. The rendered view may then by presented to the user via the user interface component 110. In some examples, upon receiving the results of the query, the experiment retrieval and comparison component 118 may determine whether the query results are incomplete with respect to a portion of the requested range of values of the derived hyperparameter and, if so, prompt the user for approval to conduct additional experiments to fill in the gaps. In other examples, similar completeness verification may be performed, for example, to prompt the user if the query results for different portions of the range of values for the derived hyperparameter include underlying deviations that may reduce the meaningfulness of rendered view (e.g., a first portion of the range includes experiments for a first set of values of another unrelated hyperparameter and a second portion of the range includes experiments for a second set of values of the other unrelated hyperparameter).

The computing device(s) 102 may be implemented as one or more laptop computers, desktop computers, servers, and so on. In examples, the computing device(s) 102 is configured in a cluster, data center, cloud computing environment, or a combination thereof. In one example, the computing device(s) 102 provides cloud computing resources, including computational resources, network resources, storage resources, and the like, that operate remotely to another computing device, such as a client device. To illustrate, the computing device(s) 102 may implement a cloud computing platform/infrastructure for building, deploying, and/or managing applications and/or services.

The memory 106 is an example non-transitory computer-readable media. The memory 106 may store an operating system and/or one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

The techniques discussed herein may be implemented in various contexts. In some examples, the techniques are implemented in the context of a machine learning application, such as TensorFlow, PyTorch, Caffe, Caffe2, etc.

Figure 2:
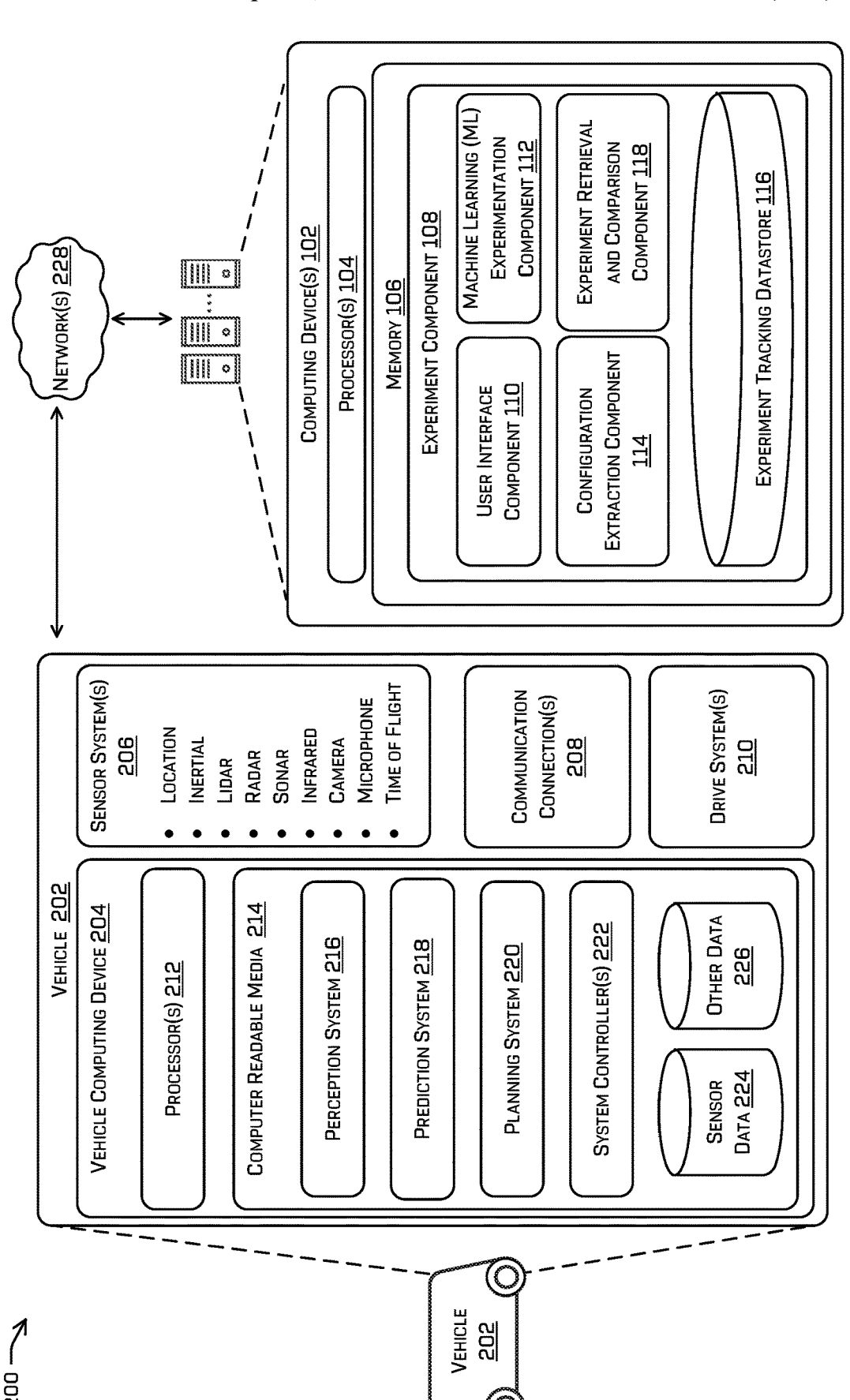
FIG. 2 depicts a block diagram of an example system for implementing the techniques described herein.

FIG. 2 is a block diagram of an example system 200 for implementing the techniques described herein, in accordance with embodiments of the disclosure. In some examples, the system 200 may include one or multiple features, components, and/or functionality of embodiments described herein with reference to FIG. 1. In some embodiments, the system 200 can include a vehicle 202 and the computing device(s) 102 of FIG. 1. The vehicle 202 may include a vehicle computing device 204, one or more sensor systems 206, one or more communication connections 208, and one or more drive systems 210.

The vehicle computing device 204 may include one or more processors 212 and computer readable media 214 communicatively coupled with the one or more processors 212. In the illustrated example, the vehicle 202 is an autonomous vehicle; however, the vehicle 202 could be any other type of vehicle, or any other system (e.g., a robotic system, a camera enabled smartphone, etc.). In the illustrated example, the computer readable media 214 of the vehicle computing device 204 stores a perception system 216, a prediction system 218, a planning system 220, one or more system controllers 222 as well as sensor data 224 and other data 226. Though depicted in FIG. 2 as residing in computer readable media 214 for illustrative purposes, it is contemplated that the perception system 216, the prediction system 218, the planning system 220, the one or more system controllers 222 as well as the sensor data 224 and the other data 226, may additionally, or alternatively, be accessible to the vehicle 202 (e.g., stored on, or otherwise accessible by, computer readable media remote from the vehicle 202).

In at least one example, the perception system 216 may be configured to receive sensor data 224 (e.g., radar data) captured during one or more-time interval intervals associated with the sensor system 206. The perception system 216 can include functionality to perform object detection, segmentation, and/or classification. In some examples, the perception system 216 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception system 216 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. The processed sensor data may be output to the prediction system 218 and/or the planning system 220.

The planning system 220 may determine a path for the vehicle to follow to traverse through the physical environment. For example, the planning system 220 may determine various routes and trajectories and various levels of detail. For example, the planning system 220 may determine a route to travel from a current location to a target location. For the purpose of this discussion, a route may include a sequence of waypoints for travelling between two locations.

In at least one example, the vehicle computing device 204 can include one or more system controllers 222, which can be configured to control steering, propulsion, braking, safety, emitters, communication, and other systems of the vehicle 202. These system controller(s) 222 may communicate with and/or control corresponding systems of the drive system(s) 210 and/or other components of the vehicle 202.

In some instances, aspects of some or all of the components discussed herein can include any models, algorithms, and/or machine learning algorithms. For example, in some instances, components in the computer readable media 214 such as the perception system 216, the prediction system 218, and/or planning system 220, and may be implemented as one or more neural networks. For instance, the perception system 216 may comprise a machine learned model (e.g., neural network) which has been trained to predict speed, trajectory, and/or other characteristics of a pedestrian (or other object) based on image data. More particularly, the machine learned model utilized by the perception system 216 may be developed and trained using the experiment component 108 and provided the vehicle 202 by the computing device(s) 102 via the network(s) 228.

In at least one example, the sensor system(s) 206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 206 can include multiple instances of each of these or other types of sensors. For instance, the lidar sensors may include individual lidar sensors located at the corners, front, back, sides, and/or top of the vehicle 202. As another example, the camera sensors can include multiple cameras disposed at various locations about the exterior and/or interior of the vehicle 202. The sensor system(s) 206 may provide input to the vehicle computing device 204. Additionally, or alternatively, the sensor system(s) 206 can send sensor data, via the one or more networks 228, to the one or more computing device(s) at a particular frequency, after a lapse of a predetermined period of time, in near real-time, etc.

The vehicle 202 can also include one or more communication connection(s) 208 that enable communication between the vehicle 202 and one or more other local or remote computing device(s). For instance, the communication connection(s) 208 may facilitate communication with other local computing device(s) on the vehicle 202 and/or the drive system(s) 210. Also, the communication connection(s) 208 may allow the vehicle 202 to communicate with other nearby computing device(s) (e.g., other nearby vehicles, traffic signals, etc.). The communications connection(s) 208 also enable the vehicle 202 to communicate with remote teleoperations computing device or other remote services.

The communications connection(s) 208 may include physical and/or logical interfaces for connecting the vehicle computing device 204 to another computing device (e.g., computing device(s) 102) and/or a network, such as network(s) 228. For example, the communications connection(s) 208 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 210. In some examples, the vehicle 202 may have a single drive system 210. In at least one example, if the vehicle 202 has multiple drive systems 210, individual drive systems 210 can be positioned on opposite ends of the vehicle 202 (e.g., the front and the rear, etc.). In at least one example, the drive system(s) 210 can include one or more sensor systems 206 to detect conditions of the drive system(s) 210 and/or the surroundings of the vehicle 202, as discussed above. By way of example and not limitation, the sensor system(s) 206 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 210. In some cases, the sensor system(s) 206 on the drive system(s) 210 can overlap or supplement corresponding systems of the vehicle 202.

In at least one example, the components discussed herein can process sensor data 224, as described above, and may send their respective outputs, over the one or more network(s) 228, to one or more computing device(s) 102. In at least one example, the components discussed herein may send their respective outputs to the one or more computing device(s) 102 at a particular frequency, after a lapse of a predetermined period of time, in near real-time, etc.

In some examples, the vehicle 202 can send sensor data to one or more computing device(s) 102 via the network(s) 228. In some examples, the vehicle 202 can send raw sensor data 224 to the computing device(s) 102. In other examples, the vehicle 202 can send processed sensor data 224 and/or representations of sensor data (for instance, the object perception tracks) to the computing device(s) 102. In some examples, the vehicle 202 can send sensor data 224 to the computing device(s) 102 at a particular frequency, after a lapse of a predetermined period of time, in near real-time, etc. In some cases, the vehicle 202 can send sensor data (raw or processed) to the computing device(s) 102 as one or more log files.

As mentioned above, the experiment component 108 may be utilized to develop and train a machine learned models. The experiment component 108 may utilize the sensor data and/or other information provided by the vehicle 202 in developing and training the machine learned models. In some instances, one or more machine learned models utilized by the perception system 216, prediction system 218, and planning system 220 may be developed and output by the experiment component 108 and provided the vehicle 202 by the computing device(s) 102 via the network(s) 228.

As described herein, machine learned models may include the neural networks. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 212 of the vehicle 202 may be any suitable processor capable of executing instructions to process data and perform operations as described herein. By way of example and not limitation, the processor(s) 212 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

The computer readable media 214 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 2 is illustrated as a distributed system, in alternative examples, components of the vehicle 202 can be associated with the computing device(s) 102 and/or components of the computing device(s) 102 can be associated with the vehicle 202. That is, the vehicle 202 can perform one or more of the functions associated with the computing device(s) 102, and vice versa. Further, aspects of experiment component 108 can be performed on any of the devices discussed herein.

FIG. 3 illustrates an example process 300 for experimentation on ML models including hyperparameter neutral tracking of experimental results. More particularly, process 300 may relate to the generating and storing experiment results such that subsequent retrieval and/or comparison between current and previous experiments may be conducted regardless of whether any experiment hyperparameters may have changed in the interim. This process 300 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The process 300 can be performed by any component, such as the processor(s) 104 of the computing device(s) 102 of FIG. 1, the vehicle computing device 204 of FIG. 2, another processing unit or computing device, etc. For ease of discussion, the process 300 will be discussed in the context of FIG. 1.

In FIG. 3, at 302, the experiment component 108 may receive the ML model and experiment setup. As discussed above regarding FIG. 1, the ML model and experiment setup may include a ML model and parameters of an experiment to be performed with regard thereto.

At 304, the experiment component 108 may determine whether the ML model and experiment setup was provided as a configuration file or as code. If the ML model and experiment setup was provided as a configuration file, the process may continue to 306. At 306, the experiment component 108 may capture the configurable hyperparameter set of the ML model from the configuration file. Alternatively, if, at 304, the experiment component 108 determines the ML model and experiment setup was provided as code, the process may continue to 308. At 308, the experiment component 108 may capture the configurable hyperparameter set of the ML model from the code based on the global constants in the code.

At 310, to the experiment component 108 may generate a data structure representing the configurable hyperparameter set of the ML model. At 312, the experiment component 108 may perform training and testing on the ML model. In examples in which the experiment setup includes multiple values for one or more experiment hyperparameters of the ML model, the experiment component 108 may perform training and testing on a version of the ML model for one or more combinations of the values of the experiment hyperparameter. At 314, the experiment component 108 may generate experiment results based on the training and testing of the ML model. As discussed above, the experiment results may include one or more metrics specified by the ML model and experiment setup and/or any other information related to the experiment, the ML model and/or the training and testing thereof.

At 316, the experiment component 108 may store the experiment results in a datastore that is searchable based on the configurable hyperparameter set of the ML (e.g., the experiment tracking datastore 116) as discussed above.

Then, at 318, the experiment component 108 may determine whether the ML model and experiment setup included a request for a view the results. If not, the process may return to 302. If so, the process may continue to 320 where a view of the results may be generated and output to a user. The process may then return to 302.

FIG. 4 illustrates an example process 400 for retrieval and presentation of current and/or past experimental results. More particular, process 400 may provide for retrieval and/or comparison between current and previous experiments regardless of whether any experiment hyperparameters may have changed in the interim. The process 400 can be performed by any component, such as the processor(s) 104 of the computing device(s) 102 of FIG. 1, the vehicle computing device 204 of FIG. 2, another processing unit or computing device, etc. For ease of discussion, the process 400 will be discussed in the context of FIG. 1.

In particular, at 402, the experiment component 108 may receive a request for a view of the results of one or more experiment(s). At 404, the experiment component 108 may perform a query of a datastore (e.g., experiment tracking datastore 116) for an experiment included in the request which has not been processed. At 406, the experiment component 108 may determine whether the query found a result for the requested experiment. If so, the process may continue to 408. Otherwise, the process may continue to 410.

At 408, the experiment component 108 may render the results of the retrieved experiment into a requested view. Where multiple experiments are requested in a comparison form, the results for multiple experiments may be merged into a single view.

At 410, the experiment component 108 may prompt the user for approval to perform the missing experiment. At 412, the experiment component may receive a response from the user and determine whether the user approved the performance of the missing experiment. If so, the process may continue to 414. Otherwise, the process may continue to 418.

At 414, the experiment component 108 may configure an experiment request for the missing experiment. The experiment component 108 may then perform the operations previously discussed above with regard to the blocks 302-316 to generate experimental results for the missing experiment. The process may then continue to 408.

At 418, the experiment component 108 may determine whether all of the requested experiments have been processed. If not, the process may return to 404 to process the next experiment included in the received request. Otherwise, the process may continue to 420.

At 420, the experiment component 108 may output the rendered view as a response to the request received at 402. For example, the rendered view may be output to a user via a display.

FIG. 5 illustrates an example view 500 output by the experiment component 108. More particularly, the example view 500 may be a comparison view requested for experiments performed for a range of a first configurable hyperparameter (e.g., block dropout) over multiple values of a second configurable hyperparameter (e.g., initial dropout). As shown, the view includes a line chart with a line for each initial dropout value (e.g., the second configurable hyperparameter), where each line plots the relationship of block dropout (e.g., the first configurable hyperparameter) to a metric (e.g., hit rate).

Of course, the view illustrated in FIG. 5 is merely an example in any other type of chart, graph, visualization or report may be utilized depending on the particular request.

EXAMPLE CLAUSES

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A. A method comprising receiving, by a machine learning (ML) experiment system, an experiment request associated with an ML model including an experiment hyperparameter and a hyperparameter, the experiment request including a plurality of values of the experiment hyperparameter, a static value of the hyperparameter; generating, by the ML experiment system, a configurable hyperparameter set of the ML model including the experiment hyperparameter and the hyperparameter; training, by the ML experiment system, the ML model with the experiment hyperparameter having a first value of the plurality of values of the experiment hyperparameter and the hyperparameter having the static value to generate a first experimental result corresponding to a first version of the configurable hyperparameter set with the experiment hyperparameter of the configurable hyperparameter set having the first value and the hyperparameter of the configurable hyperparameter set having the static value, the first experimental result including a first metric value of a metric determined based on the training of the ML model with the experiment hyperparameter having the first value and the hyperparameter having the static value; storing, by the ML experiment system, the first experimental result in an experiment tracking datastore based on the first version of the configurable hyperparameter set of the ML model such that the first experimental result is retrievable based on a first query including one or more first query parameters that match one or more corresponding configurable hyperparameters of the first version of the configurable hyperparameter set; training, by the ML experiment system, the ML model with the experiment hyperparameter having a second value of the plurality of values of the experiment hyperparameter and the hyperparameter having the static value to generate a second experimental result corresponding to a second version of the configurable hyperparameter set with the experiment hyperparameter of the configurable hyperparameter set having the second value and the hyperparameter of the configurable hyperparameter set having the static value, the second experimental result including a second value of the metric determined based on the training of the ML model with the experiment hyperparameter having the second value of the plurality of values of the experiment hyperparameter and the hyperparameter having the static value; storing, by the ML experiment system, the second experimental result in the experiment tracking datastore based on the second version of the configurable hyperparameter set of the ML model such that the second experimental result is retrievable based on a second query that includes one or more second query parameters that match one or more corresponding configurable hyperparameters of the second version of the configurable hyperparameter set; rendering a visualization based on the plurality of values of the experiment hyperparameter, the first experimental result and the second experimental result; and outputting the visualization in response to the experiment request.

B. The method of clause A, further comprising: receiving, by the ML experiment system, another experiment request associated with the ML model, the other experiment request including a plurality of other values of the hyperparameter and another static value of the experiment hyperparameter; evaluating, by the ML experiment system, the ML model with the experiment hyperparameter having the other static value and the hyperparameter having another value of the plurality of other values of the hyperparameter to generate a third experimental result corresponding to a third version of the configurable hyperparameter set with the hyperparameter of the configurable hyperparameter set having the other value and the experiment hyperparameter of the configurable hyperparameter set having the other static value; and storing, by the ML experiment system, the third experimental result in the experiment tracking datastore based on the third version of the configurable hyperparameter set of the ML model such that the third experimental result is retrievable based on a third query including one or more third query parameters that match one or more corresponding configurable hyperparameters of the third version of the configurable hyperparameter set.

C. The method of clause A, wherein the generating the configurable hyperparameter set comprises: capturing one or more global constants from code of the experiment request; and generating the configurable hyperparameter set to include respective configurable hyperparameters for the one or more captured global constants.

D. The method of clause A, wherein the experiment hyperparameter is one of: a number of hidden layers parameter; a number of nodes per layer parameter; a dropout parameter; a network weight initialization parameter; an activation function parameter; a learning rate parameter; a momentum parameter; a number of epochs parameter; or a batch size parameter.

E. The method of clause A, wherein the metric is one of: an accuracy metric; a log loss metric; a precision metric; a recall or true positive rate metric; a specificity metric; a confusion matrix metric; a type I error metric; a type II error metric; or a F1 score metric.

F. The method of clause A, further comprising: receiving a query with a set of query parameters including a plurality of queried values of the configurable hyperparameters; retrieving, based at least in part on the query, a stored experimental result from the experiment tracking datastore that matches the set of query parameters, the stored experimental result including the first experimental result; determining, based at least in part on the query, that the experiment tracking datastore lacks a missing experimental result that matches another queried value of the plurality of queried values; evaluating the ML model to generate the missing experimental result based on the other queried value of the plurality of queried values of the hyperparameter and the queried value of the experiment hyperparameter; rendering another visualization based on the first experimental result and the missing experimental result; and outputting the other visualization in response to the query.

G. One or more non-transitory computer-readable media storing instructions executable by one or more processors that, when executed, cause the one or more processors to perform acts comprising: receiving, by a machine learning (ML) experiment system, an experiment request associated with an ML model including a experiment hyperparameter and a hyperparameter, the experiment request including a plurality of values of the experiment hyperparameter and a static value of the hyperparameter; generating, by the ML experiment system, a configurable hyperparameter set of the ML model including the experiment hyperparameter and the hyperparameter; evaluating, by the ML experiment system, the ML model with the experiment hyperparameter having a value of the plurality of values of the experiment hyperparameter and the hyperparameter having the static value to generate an experimental result corresponding to a version of the configurable hyperparameter set with the experiment hyperparameter of the configurable hyperparameter set having the value and the hyperparameter of the configurable hyperparameter set having the static value; and storing a queryable association of the configurable hyperparameter set and the experimental result in an experiment tracking datastore such that the experimental result is retrievable based on a query including one or more query parameters that match one or more corresponding configurable hyperparameters of the version of the configurable hyperparameter set.

H. The one or more non-transitory computer-readable media of clause G, wherein the acts further comprise: receiving a query with a set of query parameters including a derived hyperparameter defined as a function of a plurality of the configurable hyperparameters; retrieving, based at least in part on the query, a stored experimental result from the experiment tracking datastore that matches the set of query parameters, the stored experimental result including the experimental result; rendering another visualization based on the experimental result and the derived hyperparameter.

I. The one or more non-transitory computer-readable media of clause G, wherein the acts further comprise: receiving, by the ML experiment system, another experiment request associated with the ML model, the other experiment request including a plurality of other values of the hyperparameter and another static value of experiment hyperparameter; evaluating, by the ML experiment system, the ML model with the experiment hyperparameter having the other static value and the hyperparameter having another value of the plurality of other values of the hyperparameter to generate another experimental result corresponding to another version of the configurable hyperparameter set with the hyperparameter of the configurable hyperparameter set having the other value and the experiment hyperparameter of the configurable hyperparameter set having the other static value; and storing, by the ML experiment system, the other experimental result in the experiment tracking datastore based on the other version of the configurable hyperparameter set of the ML model such that the other experimental result is retrievable based on another query including one or more other query parameters that match one or more corresponding configurable hyperparameters of the other version of the configurable hyperparameter set.

J. The one or more non-transitory computer-readable media of clause G, wherein generating the configurable hyperparameter set comprises: capturing a global constant from code of the experiment request; and generating the configurable hyperparameter set to include a respective configurable hyperparameter for the global constant.

K. The one or more non-transitory computer-readable media of clause G, wherein the experiment hyperparameter is one of: a number of hidden layers parameter; a number of nodes per layer parameter; a dropout parameter; a network weight initialization parameter; an activation function parameter; a learning rate parameter; a momentum parameter; a number of epochs parameter; or a batch size parameter.

L. The one or more non-transitory computer-readable media of clause G, wherein the experimental result includes a metric, the metric being one of: an accuracy metric; a log loss metric; a precision metric; a recall or true positive rate metric; a specificity metric; a confusion matrix metric; a type I error metric; a type II error metric; or a F1 score metric.

M. The one or more non-transitory computer-readable media of clause G, wherein the acts further comprise: receiving a query with a set of query parameters including a plurality of queried values of the configurable hyperparameters; retrieving, based at least in part on the query, a stored experimental result from the experiment tracking datastore that matches the set of query parameters, the stored experimental result including the experimental result; determining, based at least in part on the query, that the experiment tracking datastore lacks a missing experimental result that matches another queried value of the plurality of queried values; evaluating the ML model to generate the missing experimental result based on the other queried value of the plurality of queried values of the hyperparameter and the queried value of the experiment hyperparameter; rendering a visualization based on the experimental result and the missing experimental result; and outputting the visualization in response to the query.

N. A system comprising: one or more processors; and one or more non-transitory computer-readable media storing instructions executable by the one or more processors, wherein the instructions, when executed, cause the one or more processors to perform acts comprising: receiving, by a machine learning (ML) experiment system, an experiment request associated with an ML model including a experiment hyperparameter and a hyperparameter, the experiment request including a plurality of values of the experiment hyperparameter and a static value of the hyperparameter; generating, by the ML experiment system, a configurable hyperparameter set of the ML model including the experiment hyperparameter and the hyperparameter; evaluating, by the ML experiment system, the ML model with the experiment hyperparameter having a value of the plurality of values of the experiment hyperparameter and the hyperparameter having the static value to generate an experimental result corresponding to a version of the configurable hyperparameter set with the experiment hyperparameter of the configurable hyperparameter set having the value and the hyperparameter of the configurable hyperparameter set having the static value; and storing a queryable association of the configurable hyperparameter set and the experimental result in an experiment tracking datastore such that the experimental result is retrievable based on a query including one or more query parameters that match one or more corresponding configurable hyperparameters of the version of the configurable hyperparameter.

O. The system of clause N, wherein the acts further comprise: receiving a query with a set of query parameters including a derived hyperparameter defined as a function of a plurality of the configurable hyperparameters; retrieving, based at least in part on the query, a stored experimental result from the experiment tracking datastore that matches the set of query parameters, the stored experimental result including the experimental result; rendering another visualization based on the experimental result and the derived hyperparameter.

P. The system of clause N, wherein the acts further comprise: receiving, by the ML experiment system, another experiment request associated with the ML model, the other experiment request including a plurality of other values of the hyperparameter and another static value of experiment hyperparameter; evaluating, by the ML experiment system, the ML model with the experiment hyperparameter having the other static value and the hyperparameter having another value of the plurality of other values of the hyperparameter to generate another experimental result corresponding to another version of the configurable hyperparameter set with the hyperparameter of the configurable hyperparameter set having the other value and the experiment hyperparameter of the configurable hyperparameter set having the other static value; and storing, by the ML experiment system, the other experimental result in the experiment tracking datastore based on the other version of the configurable hyperparameter set of the ML model such that the other experimental result is retrievable based on another query including one or more other query parameters that match one or more corresponding configurable hyperparameters of the other version of the configurable hyperparameter set.

Q. The system of clause N, wherein generating the configurable hyperparameter set comprises: capturing a global constant from code of the experiment request; and generating the configurable hyperparameter set to include a respective configurable hyperparameter for the captured global constant.

R. The system of clause N, wherein the experiment hyperparameter is one of: a number of hidden layers parameter; a number of nodes per layer parameter; a dropout parameter; a network weight initialization parameter; an activation function parameter; a learning rate parameter; a momentum parameter; a number of epochs parameter; or a batch size parameter.

S. The system of clause N, wherein the experimental result includes a metric, the metric being one of: an accuracy metric; a log loss metric; a precision metric; a recall or true positive rate metric; a specificity metric; a confusion matrix metric; a type I error metric; a type II error metric; or a F1 score metric.

T. The system of clause N, wherein the acts further comprise: receiving a query with a set of query parameters including a plurality of queried values of the configurable hyperparameters; retrieving, based at least in part on the query, a stored experimental result from the experiment tracking datastore that matches the set of query parameters, the stored experimental result including the experimental result; determining, based at least in part on the query, that the experiment tracking datastore lacks a missing experimental result that matches another queried value of the plurality of queried values; evaluating the ML model to generate the missing experimental result based on the other queried value of the plurality of queried values of the hyperparameter and the queried value of the experiment hyperparameter; rendering a visualization based on the experimental result and the missing experimental result; and outputting the visualization in response to the query.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving, by a machine learning (ML) experiment system, an experiment request associated with an ML model including a first hyperparameter and a second hyperparameter, wherein the first hyperparameter is an experiment hyperparameter, the second hyperparameter has a static value, and the experiment request comprises a plurality of values for the first hyperparameter;

generating, by the ML experiment system, a configurable hyperparameter set of the ML model including the first hyperparameter and the second hyperparameter;

training, by the ML experiment system, the ML model with the first hyperparameter having a first value of the plurality of values of the first hyperparameter and the second hyperparameter having the static value to generate a first experimental result corresponding to a first version of the configurable hyperparameter set with the first hyperparameter of the configurable hyperparameter set having the first value and the second hyperparameter of the configurable hyperparameter set having the static value, the first experimental result including a first metric value of a metric determined based on the training of the ML model with the first hyperparameter having the first value of the plurality of values of the first hyperparameter and the second hyperparameter having the static value;

storing, by the ML experiment system, the first experimental result in an experiment tracking datastore based on the first version of the configurable hyperparameter set of the ML model such that the first experimental result is retrievable based on a first query including one or more first query parameters that match values of one or more corresponding configurable hyperparameters of the first version of the configurable hyperparameter set;

training, by the ML experiment system, the ML model with the first hyperparameter having a second value of the plurality of values of the first hyperparameter and the second hyperparameter having the static value to generate a second experimental result corresponding to a second version of the configurable hyperparameter set with the first hyperparameter of the configurable hyperparameter set having the second value and the second hyperparameter of the configurable hyperparameter set having the static value, the second experimental result including a second value of the metric determined based on the training of the ML model with the first hyperparameter having the second value of the plurality of values of the first hyperparameter and the second hyperparameter having the static value;

storing, by the ML experiment system, the second experimental result in the experiment tracking datastore based on the second version of the configurable hyperparameter set of the ML model such that the second experimental result is retrievable based on a second query that includes one or more second query parameters that match one or more corresponding configurable hyperparameters of the second version of the configurable hyperparameter set;

rendering a visualization based on the plurality of values of the first hyperparameter, the first experimental result and the second experimental result; and outputting the visualization in response to the experiment request.

2. The method of claim 1, further comprising:

receiving, by the ML experiment system, another experiment request associated with the ML model, the other experiment request including a plurality of other values of the second hyperparameter and another static value of the first hyperparameter;

evaluating, by the ML experiment system, the ML model with the first hyperparameter having the other static value and the second hyperparameter having another value of the plurality of other values of the second hyperparameter to generate a third experimental result corresponding to a third version of the configurable hyperparameter set with the second hyperparameter of the configurable hyperparameter set having the other value and the first hyperparameter of the configurable hyperparameter set having the other static value; and storing, by the ML experiment system, the third experimental result in the experiment tracking datastore based on the third version of the configurable hyperparameter set of the ML model such that the third experimental result is retrievable based on a third query including one or more third query parameters that match one or more corresponding configurable hyperparameters of the third version of the configurable hyperparameter set.

3. The method of claim 1, wherein the generating the configurable hyperparameter set comprises:

capturing one or more global constants from code of the experiment request; and generating the configurable hyperparameter set to include respective configurable hyperparameters for the one or more captured global constants.

4. The method of claim 1, wherein the first hyperparameter is one of:

a number of hidden layers parameter;

a number of nodes per layer parameter;

a dropout parameter;

a network weight initialization parameter;

an activation function parameter;

a learning rate parameter;

a momentum parameter;

a number of epochs parameter; or a batch size parameter.

5. The method of claim 1, wherein the metric is one of:

an accuracy metric;

a log loss metric;

a precision metric;

a recall or true positive rate metric;

a specificity metric;

a confusion matrix metric;

a type I error metric;

a type II error metric; or a F1 score metric.

6. The method of claim 1, further comprising:

receiving a query with a set of query parameters including a plurality of queried values of the configurable hyperparameters;

retrieving, based at least in part on the query, a stored experimental result from the experiment tracking datastore that matches the set of query parameters, the stored experimental result including the first experimental result;

determining, based at least in part on the query, that the experiment tracking datastore lacks a missing experimental result that matches another queried value of the plurality of queried values;

evaluating the ML model to generate the missing experimental result based on the other queried value of the plurality of queried values of the second hyperparameter and the queried value of the first hyperparameter;

rendering another visualization based on the first experimental result and the missing experimental result; and outputting the other visualization in response to the query.

7. One or more non-transitory computer-readable media storing instructions executable by one or more processors that, when executed, cause the one or more processors to perform acts comprising:

receiving, by a machine learning (ML) experiment system, an experiment request associated with an ML model including a first hyperparameter and a second hyperparameter, wherein the first hyperparameter is an experiment hyperparameter, the second hyperparameter has a static value, and the experiment request includes a plurality of values of the first hyperparameter and the static value of the second hyperparameter;

generating, by the ML experiment system, a configurable hyperparameter set of the ML model including the first hyperparameter and the second hyperparameter;

training, by the ML experiment system, the ML model with the first hyperparameter having a value of the plurality of values of the first hyperparameter and the second hyperparameter having the static value to generate an experimental result corresponding to a version of the configurable hyperparameter set with the first hyperparameter of the configurable hyperparameter set having the value and the second hyperparameter of the configurable hyperparameter set having the static value, the experimental result including a metric value of a metric determined based on the training of the ML model with the first hyperparameter having the value of the plurality of values of the first hyperparameter and the second hyperparameter having the static value; and storing a queryable association of the configurable hyperparameter set and the experimental result in an experiment tracking datastore such that the experimental result is retrievable based on a query including one or more query parameters that match values of one or more corresponding configurable hyperparameters of the version of the configurable hyperparameter set.

8. The one or more non-transitory computer-readable media of claim 7, wherein the acts further comprise:

receiving a query with a set of query parameters including a derived hyperparameter defined as a function of a plurality of the configurable hyperparameters;

retrieving, based at least in part on the query, a stored experimental result from the experiment tracking datastore that matches the set of query parameters, the stored experimental result including the experimental result; and rendering another visualization based on the experimental result and the derived hyperparameter.

9. The one or more non-transitory computer-readable media of claim 7, wherein the acts further comprise:

receiving, by the ML experiment system, another experiment request associated with the ML model, the other experiment request including a plurality of other values of the second hyperparameter and another static value of the first hyperparameter;

evaluating, by the ML experiment system, the ML model with the first hyperparameter having the other static value and the second hyperparameter having another value of the plurality of other values of the second hyperparameter to generate another experimental result corresponding to another version of the configurable hyperparameter set with the second hyperparameter of the configurable hyperparameter set having the other value and the first hyperparameter of the configurable hyperparameter set having the other static value; and storing, by the ML experiment system, the other experimental result in the experiment tracking datastore based on the other version of the configurable hyperparameter set of the ML model such that the other experimental result is retrievable based on another query including one or more other query parameters that match one or more corresponding configurable hyperparameters of the other version of the configurable hyperparameter set.

10. The one or more non-transitory computer-readable media of claim 7, wherein generating the configurable hyperparameter set comprises:

capturing a global constant from code of the experiment request; and generating the configurable hyperparameter set to include a respective configurable hyperparameter for the global constant.

11. The one or more non-transitory computer-readable media of claim 7, wherein the first hyperparameter is one of:

a number of hidden layers parameter;

a number of nodes per layer parameter;

a dropout parameter;

a network weight initialization parameter;

an activation function parameter;

a learning rate parameter;

a momentum parameter;

a number of epochs parameter; or a batch size parameter.

12. The one or more non-transitory computer-readable media of claim 7, wherein the experimental result includes a metric, the metric being one of:

an accuracy metric;

a log loss metric;

a precision metric;

a recall or true positive rate metric;

a specificity metric;

a confusion matrix metric;

a type I error metric;

a type II error metric; or a F1 score metric.

13. The one or more non-transitory computer-readable media of claim 7, wherein the acts further comprise:

receiving a query with a set of query parameters including a plurality of queried values of the configurable hyperparameters;

retrieving, based at least in part on the query, a stored experimental result from the experiment tracking datastore that matches the set of query parameters, the stored experimental result including the experimental result;

determining, based at least in part on the query, that the experiment tracking datastore lacks a missing experimental result that matches another queried value of the plurality of queried values;

evaluating the ML model to generate the missing experimental result based on the other queried value of the plurality of queried values of the second hyperparameter and the queried value of the first hyperparameter;

rendering a visualization based on the experimental result and the missing experimental result; and outputting the visualization in response to the query.

14. A system comprising:

one or more processors; and one or more non-transitory computer-readable media storing instructions executable by the one or more processors, wherein the instructions, when executed, cause the one or more processors to perform acts comprising:

receiving, by a machine learning (ML) experiment system, an experiment request associated with an ML model including a first hyperparameter and a second hyperparameter, wherein the first hyperparameter is an experiment hyperparameter, the second hyperparameter has a static value, and the experiment request includes a plurality of values of the first hyperparameter and the static value of the second hyperparameter;

generating, by the ML experiment system, a configurable hyperparameter set of the ML model including the first hyperparameter and the second hyperparameter;

training, by the ML experiment system, the ML model with the first hyperparameter having a value of the plurality of values of the first hyperparameter and the second hyperparameter having the static value to generate an experimental result corresponding to a version of the configurable hyperparameter set with the first hyperparameter of the configurable hyperparameter set having the value and the second hyperparameter of the configurable hyperparameter set having the static value; and storing a queryable association of the configurable hyperparameter set and the experimental result in an experiment tracking datastore such that the experimental result is retrievable based on a query including one or more query parameters that match values of one or more corresponding configurable hyperparameters of the version of the configurable hyperparameter.

15. The system of claim 14, wherein the acts further comprise:

receiving a query with a set of query parameters including a derived hyperparameter defined as a function of a plurality of the configurable hyperparameters;

retrieving, based at least in part on the query, a stored experimental result from the experiment tracking datastore that matches the set of query parameters, the stored experimental result including the experimental result; and rendering another visualization based on the experimental result and the derived hyperparameter.

16. The system of claim 14, wherein the acts further comprise:

receiving, by the ML experiment system, another experiment request associated with the ML model, the other experiment request including a plurality of other values of the second hyperparameter and another static value of the first hyperparameter;

evaluating, by the ML experiment system, the ML model with the first hyperparameter having the other static value and the second hyperparameter having another value of the plurality of other values of the second hyperparameter to generate another experimental result corresponding to another version of the configurable hyperparameter set with the second hyperparameter of the configurable hyperparameter set having the other value and the first hyperparameter of the configurable hyperparameter set having the other static value; and storing, by the ML experiment system, the other experimental result in the experiment tracking datastore based on the other version of the configurable hyperparameter set of the ML model such that the other experimental result is retrievable based on another query including one or more other query parameters that match one or more corresponding configurable hyperparameters of the other version of the configurable hyperparameter set.

17. The system of claim 14, wherein generating the configurable hyperparameter set comprises:

capturing a global constant from code of the experiment request; and generating the configurable hyperparameter set to include a respective configurable hyperparameter for the captured global constant.

18. The system of claim 14, wherein the first hyperparameter is one of:

a number of hidden layers parameter;

a number of nodes per layer parameter;

a dropout parameter;

a network weight initialization parameter;

an activation function parameter;

a learning rate parameter;

a momentum parameter;

a number of epochs parameter; or a batch size parameter.

19. The system of claim 14, wherein the experimental result includes a metric, the metric being one of:

an accuracy metric;

a log loss metric;

a precision metric;

a recall or true positive rate metric;

a specificity metric;

a confusion matrix metric;

a type I error metric;

a type II error metric; or a F1 score metric.

20. The system of claim 14, wherein the acts further comprise:

receiving a query with a set of query parameters including a plurality of queried values of the configurable hyperparameters;

retrieving, based at least in part on the query, a stored experimental result from the experiment tracking datastore that matches the set of query parameters, the stored experimental result including the experimental result;

determining, based at least in part on the query, that the experiment tracking datastore lacks a missing experimental result that matches another queried value of the plurality of queried values;

evaluating the ML model to generate the missing experimental result based on the other queried value of the plurality of queried values of the second hyperparameter and the queried value of the first hyperparameter;

rendering a visualization based on the experimental result and the missing experimental result; and outputting the visualization in response to the query.

* * * * *